(12) United States Patent
Durand

(10) Patent No.: US 6,817,511 B2
(45) Date of Patent: Nov. 16, 2004

(54) METHOD FOR JOINING AXLE COMPONENTS

(75) Inventor: Robert D Durand, Wyomissing, PA (US)

(73) Assignee: Dana Corporation, Toledo, OH (US)

(*) Notice: Subject to any disclaimer, the term of this patent is extended or adjusted under 35 U.S.C. 154(b) by 84 days.

(21) Appl. No.: 10/319,635

(22) Filed: Dec. 16, 2002

(65) Prior Publication Data

US 2004/0112942 A1 Jun. 17, 2004

(51) Int. Cl.[7] .............................................. B23K 31/02
(52) U.S. Cl. ...................... 228/115; 228/235.1; 29/508; 29/897.2
(58) Field of Search ......................... 228/115, 233.1, 228/234.1, 235.1; 219/611, 617; 29/897.2, 508, 518, 520

(56) References Cited

U.S. PATENT DOCUMENTS

| | | | |
|---|---|---|---|
| 3,436,806 A | | 4/1969 | Supan |
| 3,520,049 A | * | 7/1970 | Dudin et al. ................. 219/617 |
| 3,751,021 A | * | 8/1973 | Foster .......................... 267/52 |
| 4,067,216 A | | 1/1978 | Khimenko et al. |
| 4,504,714 A | | 3/1985 | Katzenstein |
| 4,513,488 A | | 4/1985 | Arena |
| 4,807,351 A | | 2/1989 | Berg et al. |
| 5,800,024 A | | 9/1998 | Steimmel et al. |
| 5,966,813 A | * | 10/1999 | Durand ....................... 29/897.2 |
| 5,981,921 A | | 11/1999 | Yablochnikov |
| 6,474,534 B2 | * | 11/2002 | Gabbianelli et al. ........ 228/131 |
| 6,477,774 B1 | * | 11/2002 | Marando et al. ........... 29/897.2 |
| 6,510,920 B1 | * | 1/2003 | Durand ........................ 181/249 |
| 2002/0003159 A1 | * | 1/2002 | Gabbianelli et al. ........ 228/131 |
| 2003/0127453 A1 | * | 7/2003 | Kichline, Jr. ............... 219/617 |
| 2003/0192880 A1 | * | 10/2003 | Yablochnikov ............. 219/617 |

FOREIGN PATENT DOCUMENTS

| | | | |
|---|---|---|---|
| EP | 1188644 A1 | * | 3/2002 |
| JP | 357009586 A | * | 1/1982 |
| JP | 405254460 A | * | 10/1993 |
| WO | WO 97/00595 | * | 1/1997 |

OTHER PUBLICATIONS

Derwent–Acc–No: 2004–073078.*

* cited by examiner

Primary Examiner—Kiley Stoner
(74) Attorney, Agent, or Firm—Liniak, Berenato & White

(57) ABSTRACT

A method of joining two vehicle axle housing components made from the same or dissimilar materials includes providing a first axle housing component, and providing a second axle housing component made from a material which is same/dissimilar to the material used to make the first axle housing component, where one of the first and second axle housing components is a metallic component made of a metallic material. A portion of one of the first and second axle housing components is positioned within a portion of the other of the axle housing components in an overlapping manner, thereby forming an overlapping portion. A metallic band may be disposed around the overlapping portion. An inductor is positioned around the overlapping portion. The inductor is energized to generate a magnetic field for collapsing at leastone of the overlapping portion and the metallic band at a velocity sufficient to magnetic pulse weld the metallic component to each other, thereby securing the first and second axle housing components together.

15 Claims, 4 Drawing Sheets

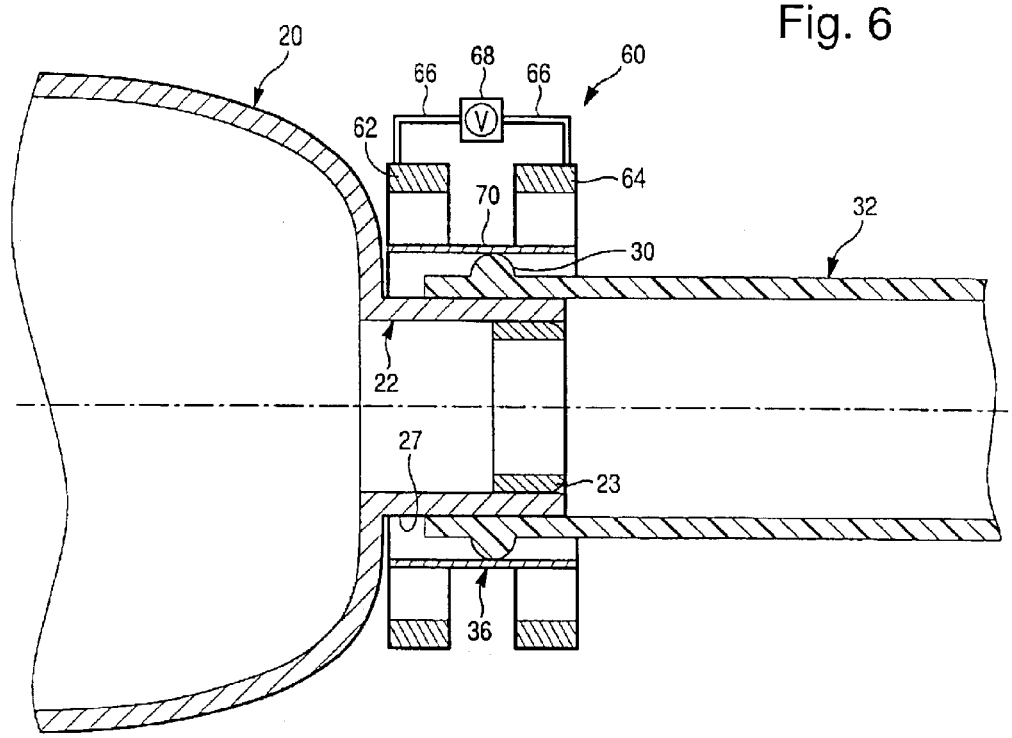
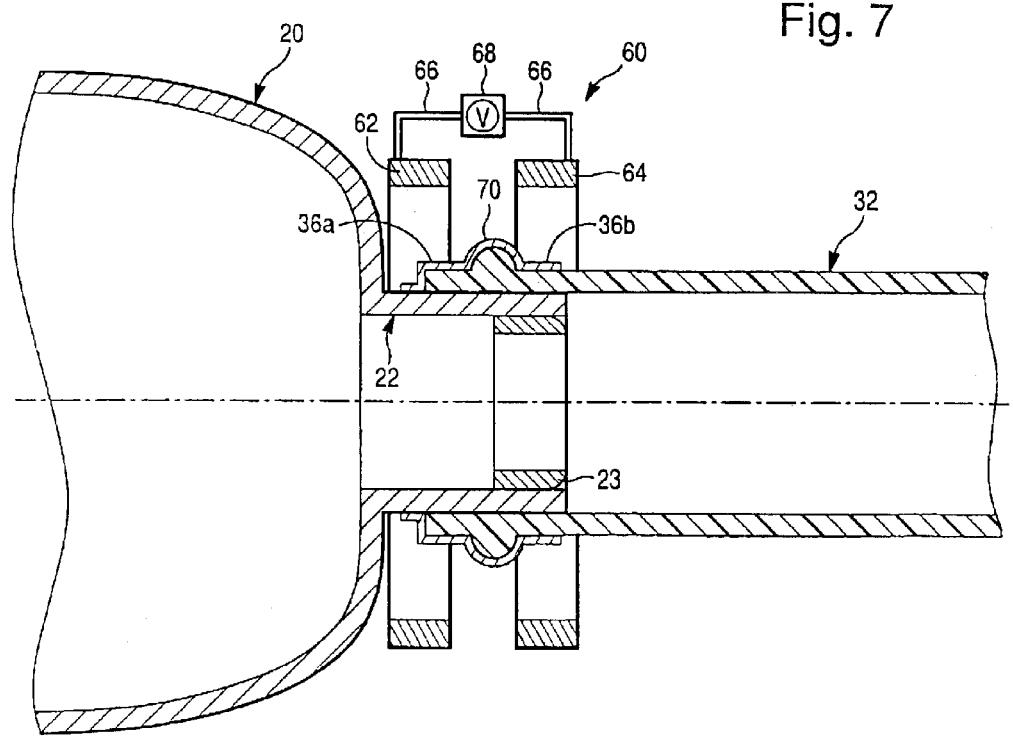

METHOD FOR JOINING AXLE COMPONENTS

BACKGROUND OF THE INVENTION

1. Field of the Invention

This invention relates in general to vehicular axle assemblies and in particular to a method for joining together vehicle components, especially those manufactured from dissimilar materials, to form such a vehicle axle assembly.

2. Background of the Invention

Axle assemblies are well known structures that are in common use in most vehicles. Such axle assemblies include a number of components, which are adapted to transmit rotational power from an engine of the vehicle to the wheels thereof. Typically, an axle assembly includes a differential assembly that is rotatably supported within a non-rotating carrier. The differential is connected between an input drive shaft extending from the vehicle engine and a pair of output axle shafts extending to the vehicle wheels. The axle shafts are contained in respective non-rotating beam portions, which are secured to the carrier. Thus, rotation of the differential by the drive shaft causes corresponding rotation of the axle shafts. The carrier and the beam portions form an axle housing for these drive train components of the axle assembly, inasmuch as the differential and the axle shafts are supported for rotation therein.

Axle housings are generally classified into two basic types. The first axle housing type is a unitized carrier construction, commonly referred to as a Salisbury or Spicer type axle assembly. In this structure, the carrier (which houses the differential assembly) is directly connected to the two beam portions (which house the rotatable axle shafts). An opening is provided at the rear of the carrier to permit assembly of the differential therein. A cover closes this opening during use. Unitized carrier axle housing constructions of this type are economical to manufacture and are readily adaptable for a variety of vehicles.

The second axle housing type is a separable carrier construction. In this structure, the axle beam portions are connected together by a central portion of the axle housing that is formed separate and apart from the differential carrier. This central portion is generally hollow and cylindrical in shape, having a large generally circular opening formed therethrough. During assembly, the differential is first assembled within the carrier, then the carrier is secured to the central member. The overall shape of this type of axle housing (i.e., the generally round shape of the central portion and the elongated beam portions extending therefrom) generally resembles the shape of a banjo musical instrument. Hence, this type of axle housing is commonly referred to as a banjo type axle housing. Banjo type axle housings are advantageous because the carrier and differential can be removed from the axle assembly for service without disturbing the other components thereof.

In the past, several methods have been employed to form axle housings, and many of these methods employ welding to form the housing.

In the past, virtually all of these axle assemblies have been manufactured from a metallic material. Steel has traditionally been the preferred material for manufacturing all of such vehicle axle components because of its relatively high strength, relatively low cost, and ease of manufacture. As mentioned above, vehicle axle housing assemblies manufactured from metallic materials have been secured together by conventional welding techniques. More recently, however, in an effort to reduce the weight of the vehicle axle assembly, it has been found desirable to use alternative materials to form some or all of the vehicle axle components. Thus, in some instances, it may be desirable to form some or all of the vehicle axle components from materials which cannot be easily secured together, or in some cases cannot be secured together at all by conventional welding techniques. For example, conventional welding techniques cannot be used to secure a metallic vehicle axle component to another non-metallic vehicle axle component. Thus, it would be desirable to provide a method for joining vehicle components together to form a vehicle axle assembly, where the components are formed from alternative materials, and particularly those components manufactured from dissimilar materials, such as metallic and non-metallic materials.

SUMMARY OF THE INVENTION

The above object as well as other objects not specifically enumerated are achieved by a method of joining axle housing components made from dissimilar materials, where the method includes providing a central carrier component, and providing a pair of hollow arm portions preferably made from a material which is dissimilar to the material used to make the carrier component. Thereafter, the arm portions are secured to the central carrier component using magnetic pulse welding techniques.

For example, where two generally conductive metallic components of similar or dissimilar material constitute the axle housing, a portion of one of the axle housing components may be positioned within a portion of the other of the components in an overlapping manner, thereby forming an overlapping portion. An inductor is positioned around the outer metallic band. The inductor is energized to generate a magnetic field for collapsing the outer and overlapping portion at a velocity sufficiently developed by an electromagnetic pulse to weld the outer and inner metallic components to each other, thereby securing the axle housing components together.

In another embodiment of the invention, the method of joining two axle housing components made from dissimilar materials where the outer member is both dissimilar and less or non-conductive, the process includes the steps of providing a first axle housing component of a metallic material, providing a second axle housing component made from a composite or non-conductive dissimilar material, the second axle housing component having a protrusion or locking feature, and positioning a portion of the first axle component within a portion of the second axle component in an overlapping manner, thereby forming an overlapping portion, where the protrusion is within the overlapping portion. A conductive metallic band is disposed around the overlapping portion, and an inductor is disposed around the metallic band. The inductor is energized to generate a magnetic field for collapsing the band about the overlapping portion at a velocity sufficiently developed by an electromagnetic pulse to weld the outer band and inner metallic component to each other, thereby securing the first and second axle housing components together, wherein the metallic band is also crimped over the protrusion securing the composite or non-conductive component to the inner metallic housing.

Various objects and advantages of this invention will become apparent to those skilled in the art from the following detailed description of the preferred embodiment, when read in light of the accompanying drawings.

BRIEF DESCRIPTION OF THE DRAWINGS

FIGS. 4 through 7 are enlarged cross-sectional views in elevation of a portion of the vehicle axle assembly illustrated in FIG. 1 sequentially illustrating the steps in the second alternate method for securing axle components in accordance with this invention.

DETAILED DESCRIPTION OF THE PREFERRED EMBODIMENT

Figure 1:
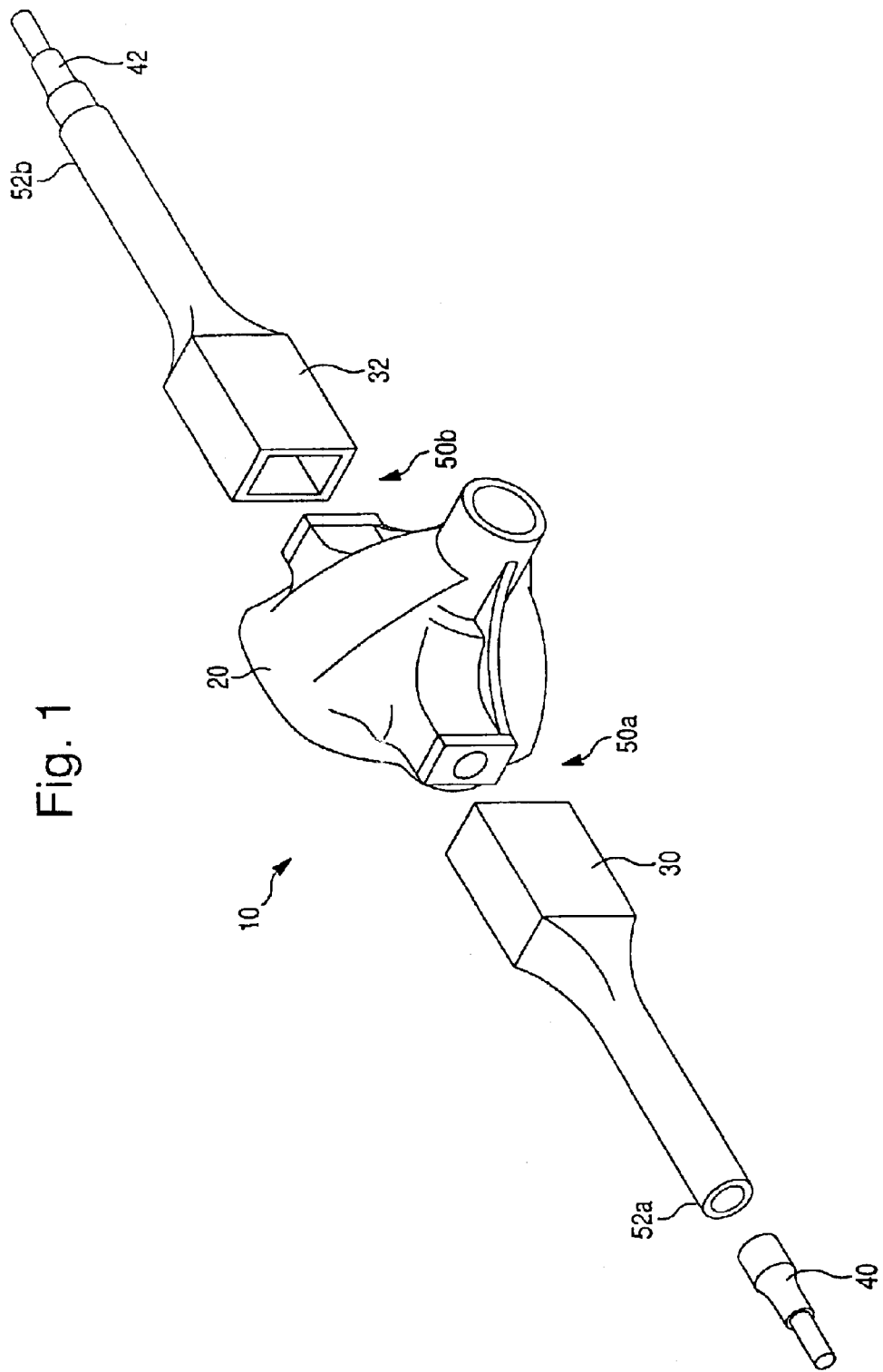
FIG. 1 is a schematic perspective exploded view of a vehicle axle assembly manufactured in accordance with the method of this invention.

Referring now to the drawings, there is schematically illustrated in FIG. 1 a vehicle axle housing assembly, indicated generally at 10, to be manufactured in accordance with the method of this invention. The illustrated vehicle axle housing assembly 10 is a three-piece assembly. However, it will be appreciated that the method of this invention may be utilized in the manufacture of any type of vehicle axle housing assembly, such as a banjo-type assembly where the structural components include a central carrier housing and a pair of axle arms combined into an integral unit.

The illustrated axle housing assembly 10 includes a hollow central carrier portion 20 and a pair of hollow arm portions 30, 32 extending laterally therefrom. The central carrier portion 30 is adapted to rotatably support a differential therein, while the arm portions 30, 32 are adapted to rotatably support a pair of axle shafts extending laterally from the differential. Typically, wheel spindles 40, 42 are provided at the ends of each of the arm portions. The wheel spindles 40, 42 rotatably support the wheels of the vehicle on the axle housing, while allowing the axle shafts to extend therethrough to rotatably drive the wheels. These components 20, 30, 32, 40, 42 can be formed having any desired structure taking into account the special features described below, as is well known to those skilled in the art and may be formed from any desired material. Preferably, the central carrier portion 20 is formed of aluminum or steel, and the hollow arm portions 30, 32 may be hydroformed aluminum or other suitable material. The spindles 40, 40 are typically made of steel, but this invention should not be limited in any way to a specific material for these components.

In the illustrated embodiment, both the central carrier portion 20 and the hollow arm portions 30, 32 are shown as closed channel structures, although the method of the invention can be used with channel structures of other configurations. Closed channel structural members can be characterized as having a continuous cross sectional shape, such as tubular or box-shaped channel members, for example. In contrast, open channel structural members can be characterized as having a non-continuous cross sectional shape, such as C-shaped or hat-shaped channel members, for example. Such open channel structural members are relatively easy and inexpensive to shape into desired configurations and to secure together. Closed channel structural members are desirable because they are generally stronger and more rigid than open channel structural members of comparable weight.

In a preferred embodiment of this invention, the axle housing member to be joined are both made from different metallic materials. For example, the center carrier portion 20 can be formed from aluminum or steel, the arm portions 30, 32 can be formed from aluminum, and the wheel spindles can be formed from steel. It is also envision that one of the two vehicle axle housing components, for example one of the carrier member or the arm portions 30, 32 to be joined together at a joint is made from a non-metallic material, while the other component is made from a metallic material. Thus, the illustrated joints 50a, 50b connect a metallic axle component to a non-metallic component. However, the method of this invention is equally suitable to form a joint 50a, 50b between two axle components made from any two dissimilar materials, even where the two dissimilar materials are generally not joinable by conventional techniques. As such, the inventive method may be used to join two axle components made from dissimilar metals or to join two axle components made from one metallic material and another, different non-metallic (or non-weldable) material.

Figure 2:
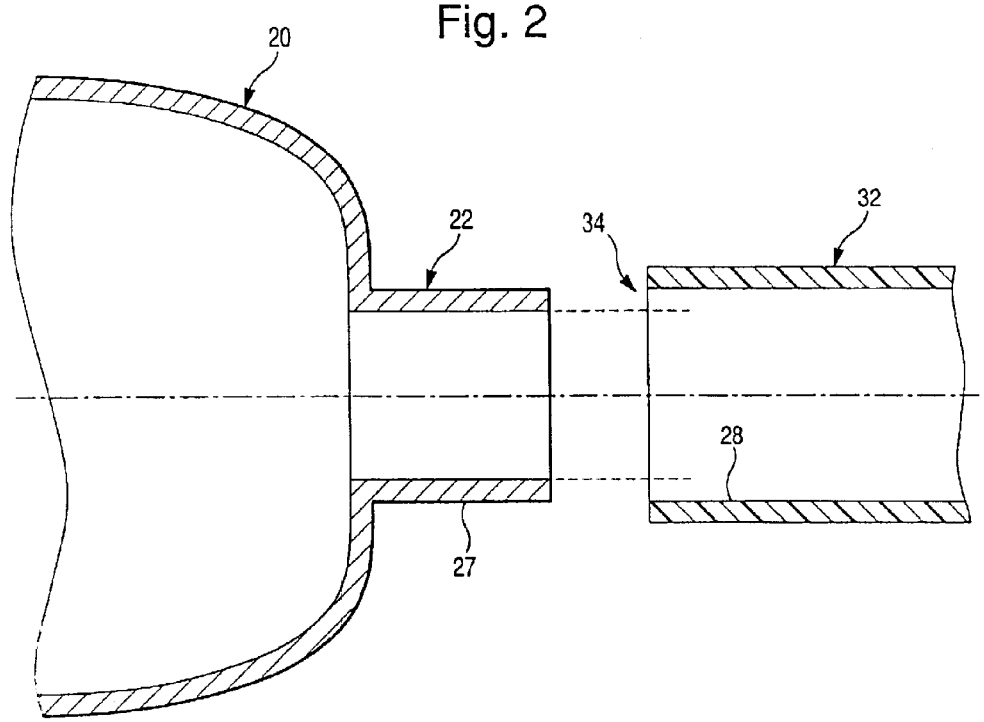
FIGS. 2 and 3 are enlarged cross-sectional views in elevation of a portion of the vehicle axle assembly illustrated in FIG. 1 sequentially illustrating the steps in the first preferred method for securing axle components in accordance with this invention.
Figure 3:
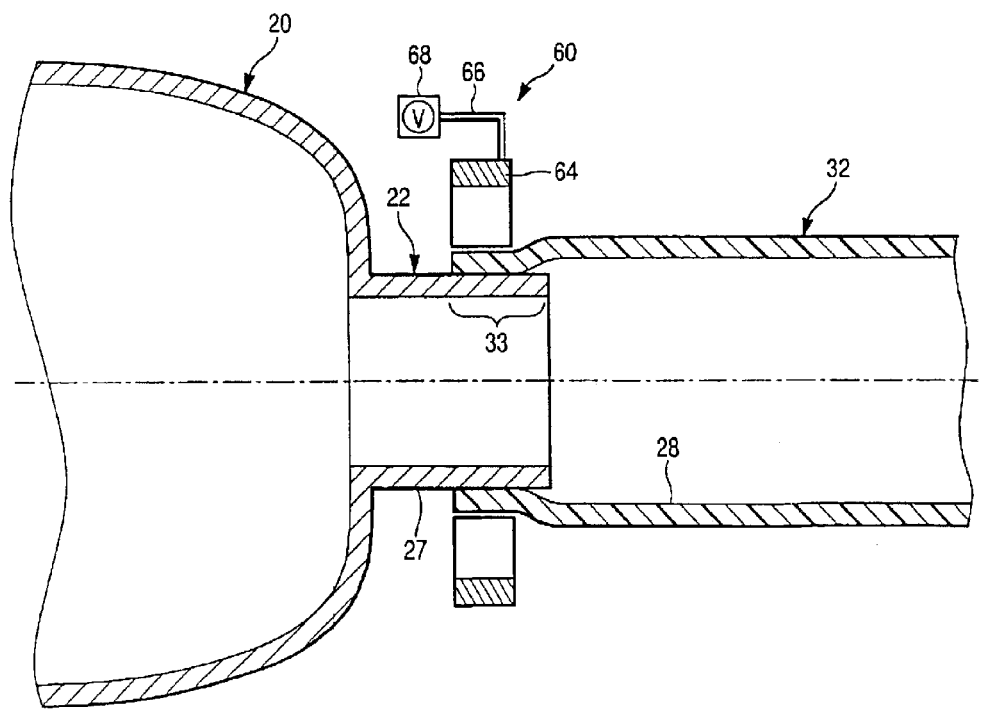
Figure 4:
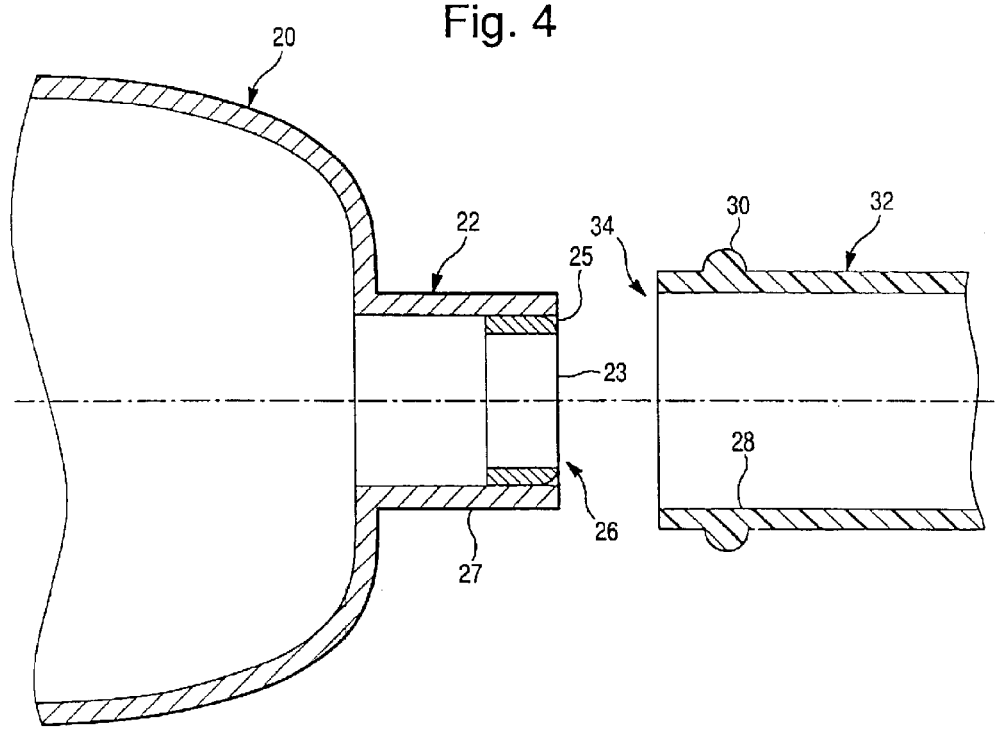

The method for joining two vehicle axle components made from dissimilar materials in accordance with this invention is shown in FIGS. 2 through 7. A first exemplary method is illustrated in FIGS. 2 and 3, and a second exemplary method is shown in FIGS. 4–7.

In a first step of the method shown in FIG. 2, a metallic carrier member 20 and a non-metallic arm portion 32 are provided. In the illustrated embodiment, both the carrier member 20 and the arm portion 32 are shown as closed channel structures, although such is not required. Metallic materials suitable for use in a vehicle axle assembly include, but are not limited to, steel, aluminum, magnesium, and alloys thereof. Non-metallic material suitable for use in a vehicle axle component include, but are not limited to plastics, layered composites, fiber matrix composites (such as an arimid/glass/carbon composite), or combinations thereof. Other non-metallic materials include reinforced inorganic composite materials and laminate materials. For purposes of this invention, all of these non-metallic materials are referred to as "composite materials".

The carrier portion 20 includes a flange 22 or other portion which extends from the carrier 20 at a location where it is desired to attach the arm portion 32. The flange 22 is adapted to be received within a portion of the arm portion, such as open end 34. The cross sectional shape of the flange 22 should be compatible with the cross sectional shape of the arm portion 32 of sufficient geometry to permit a magnetic pulse weld in the configuration where generally conductive materials are involved. Further, when the material of the outer component is composite, the perimeter of the outer surface 27 of the flange 22 will be only slightly smaller than the perimeter of the inner surface 28 of the arm portion 32 so that the cross member composite material will be supported on the 22 flange of portion 27 during and after the magnetic pulse welding. In a preferred embodiment, both the flange 22 and the arm portion 32 have a generally tubular rectangular or otherwise continuous cross section.

The second step in the method of this invention, as illustrated in FIG. 3, is to position the open end 34 of the arm portion 32 on the flange 22 such that a portion of the inner surface 28 of the arm portion 32 overlaps and contacts a portion of the outer surface 27 of the flange 22. The overlapping portion is indicated at 33.

The third step in the method of this invention is illustrated in FIG. 3. As shown, a perimeter reduction device, such as magnetic pulse welding apparatus indicated generally at 60, is disposed around and adjacent the overlapping portion 33 of the arm portion 32 and flange 27. The magnetic pulse welding apparatus 60 includes leads or terminals 66 that connect a source of power 68 to the inductor coil 64. The electromagnetic pulse apparatus 60 is adapted to generate an intense, momentary magnetic field on a localized portion of the overlapping portion 33. The intense magnetic field applied at a localized area creates inwardly directed forces which cause the arm portion 32 to collapse inwardly at that area, thereby reducing its size until it intimately contacts the flange 27 and is magnetically pulse welded to the flange 27. The contact of the two members at high velocities from appropriately defined initial geometry causes the two members to be welded together.

An alternate method of pulse welding the axle components is shown in FIGS. 4–7. In a first step of the method shown in FIG. 4, a metallic carrier member 20 and a non-metallic arm portion 30 are provided. In the illustrated embodiment, both the carrier member 20 and the arm portion 30 are shown as closed channel structures, although such is not required. Metallic materials suitable for use in a vehicle axle assembly include, but are not limited to, steel, aluminum, magnesium, and alloys thereof. Non-metallic material suitable for use in a vehicle axle component include, but are not limited to plastics, layered composites, fiber matrix composites (such as an arimid/glass/carbon composite), or combinations thereof. Other non-metallic materials include reinforced inorganic composite materials and laminate materials. For purposes of this invention, all of these non-metallic materials are referred to as "composite materials".

The carrier portion 20 includes a flange 22 or other portion which extends from the carrier 20 at a location where it is desired to attach the arm portion 30, 32. In some light axle applications (i.e., gauge of material is less than 2.5 mm), an insert 23 might be used to provide the rigidity and stiffness necessary for a successful magnetic pulse welding process. The insert 23, if required, must be intimate with the outer supported component but does not have to be welded. The flange 22 is adapted to be received within a portion of the arm portion, such as open end 24. The cross sectional shape of the flange 22 should be compatible with the cross sectional shape of the arm portion 32 of sufficient geometry to permit a magnetic pulse weld in the configuration where generally conductive materials are involved. Further, when the material of the outer component is composite, the perimeter of the outer surface 27 of the flange 22 will be only slightly smaller than the perimeter of the inner surface 28 of the arm portion 32 so that the cross member composite material will be supported on the 22 flange of portion 27 during and after the magnetic pulse welding. In a preferred embodiment, both the flange 22 and the arm portion 32 have a generally tubular rectangular or otherwise continuous cross section.

In the illustrated embodiment, the arm portion 32 includes a protrusion 30 disposed on its outer surface. As shown therein, the protrusion 30 has a generally, semi-circular cross section, although this is not required. The protrusion 30 may extend around the entire perimeter of the outer surface of the arm portion 32, or only a portion thereof. In addition, one or more rows of protrusions 30 may be positioned on the outer surface of the arm portion 32 along its axial length.

Figure 5:
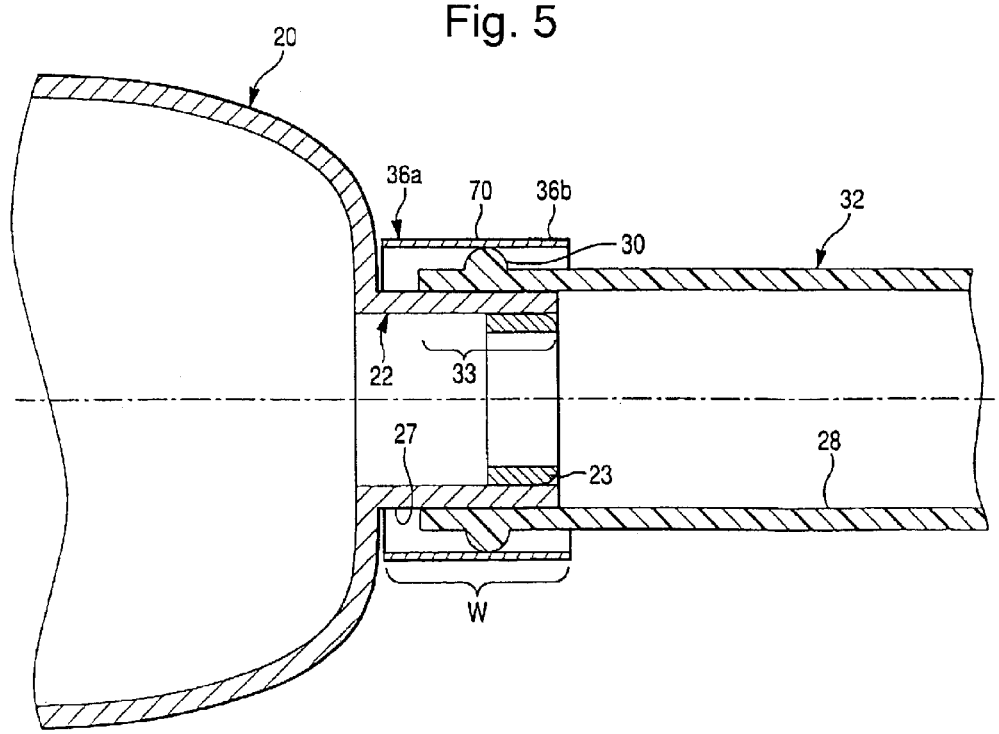

The second step in the method of this invention, as illustrated in FIG. 5, is to position the open end 34 of the arm portion 32 on the flange 22 such that a portion of the inner surface 28 of the arm portion 32 overlaps and contacts a portion of the outer surface 27 of the flange 22. The overlapping portion is indicated at 33. Next a metallic band 36 is disposed completely around the overlapping portions of the arm portion 32 and the flange 27. The metallic band 36 is a continuous, annular-shaped member of good electrically conductive material, such as but not restricted to aluminum. The metallic band 36 has a width W sufficient to extend across the width of the protrusion 30 and the overlapping portion sufficient to be welded to flange 27. The band is provided with two edge portions 36a, 36b that are aligned on either sides of the protrusion. The edge portions are adapted to contact the flange 27 and the arm portion 32, respectively, when formed radially inwardly by magnetic pulse applied to the band 36. It should be noted that the protrusion 30 is provided on the outermost of the two axle housing components, i.e. the axle housing component which is disposed around or outside the other axle housing component. Thus, if the arm portion 32 is disposed around a portion of the carrier flange 22, then the arm portion is the outermost axle housing component, and the protrusion 30 is formed on the outer surface of the arm portion 32.

The third step in the method of this invention is illustrated in FIGS. 6 and 7. As shown, a band perimeter reduction device, such as magnetic pulse welding apparatus indicated generally at 60, is disposed around the metallic band 36 and around and adjacent the overlapping portion 33 of the arm portion 32 and flange 27. The electromagnetic pulse apparatus 60 is adapted to generate an intense, momentary magnetic field on a localized portion of the metallic band 36. The intense magnetic field applied at a localized area creates inwardly directed forces which cause the metallic band 36 to collapse inwardly at that area, thereby reducing its size until it intimately contacts the arm portion 32 and is magnetically pulse welded to the flange 27. The contact of the two metallic members at high velocities from appropriately defined initial geometry causes the two metallic members to be welded together.

In the illustrated embodiment, the magnetic pulse welding apparatus 60 includes one or more inductor coils at 62 and 64. The inductor coil of apparatus 60 may involve a single turn, an opening coil comprised of a plurality of circular elements or a coil comprised of a plurality of non-opening elements (not shown) similar to that disclosed in U.S. Pat. No. 4,129,846 to Yablochnikov, which is hereby incorporated by reference. The preferred opening coil provides greater ease of manufacturing in the total assembly of the axle housing.

The magnetic pulse welding apparatus 60 includes leads or terminals 66 that connect a source of power 68 to the inductor coils at 62 and 64. The magnetic pulse welding apparatus 60 includes one or more high voltage capacitors (not shown) and a discharge circuit (not shown) that is suitable for conducting a momentary current of sufficient magnitude. The central components of an magnetic pulse welding apparatus are its capacitor bank, inductor and high current switching device. The current required to successfully deform and weld on a hollow metallic member used in a vehicle axle component, such as the band 36, may exceed one million amps, and will vary with the charge voltage of the power supply of 60, materials selected for components of the axle assembly and band 36 and gauge thickness. The discharge circuit and the capacitors operate to supply an energy spike or surge to the inductor coils 62 and 64. The inductor coils 62 and 64 create a strong magnetic field that exerts a force against the outer surface of the band 36. The effect of the intense, momentary magnetic field on the metallic band 36 is to create an extremely powerful force that repels or drives band 36 radially inwardly away from the inductor coils 62 and 64. The magnetic field created by the pulse of current through the inductor coil 62 and 64 creates strong reactive eddy currents in the metallic band 36. The eddy currents create opposing magnetic fields that result in inwardly directed forces on the metallic band 36. These forces cause the band 36 to collapse about a localized area, reducing its size until it contacts the flange 27, the protrusion 30, and the arm portion 32, thereby welding and also crimping or clinching the band 36.

The amount that the metallic band 36 is reduced in size is determined by the shape of the inductor coils 62 and 64, the developed geometry of the band 36 relative to flange 27 and portion 32 and the strength of the electromagnetic field. These factors affect the velocity of the metallic band as it is reduced in size. In the illustrated embodiment, the coil 62 disposed around the portion of the metallic band 36 located above the flange 27 is preferably adapted to both reduce the size of the band 36 until it contacts the metal flange 27 and to weld the band 34 and/or 36 to the flange 27. In contrast, the coil 64 disposed around the portion of the metallic band 36 located above the non-metallic arm portion 32 is preferably adapted to only reduce the size of the band until it contacts the arm portion 32, thereby crimping or clinching the metallic band around the protrusion 30. As can be seen in FIG. 7, one part of the band 36, i.e., edge portion 36a, is welded to the flange 27, whereas the other part of the band 36, the edge portion 36b, is attached to the arm portion 32 by crimping or clinching the band around the protrusion 30.

In an alternative embodiment, a multi turn coil, not shown, is provided for the magnetic pulse welding step. This multi turn coil is adapted to provide electromagnetic fields of variable strengths across the width of the band 36. In this embodiment, the multi turn coil is used to discretely reduce or crimp the various portions of the metallic band, such as section 36a located adjacent the flange 27, central section 70 located above the protrusion 30, and section 36b located adjacent the arm portion 32.

As shown in FIG. 7, the magnetic pulse welding apparatus 60 is operated so that the coils 62 and 64 each create an electromagnetic field which causes the metallic band 36 to be reduced in size around the flange 27, the protrusion 30, and the arm portion 32. The coil 62 is operated such that the section of the metallic band 36 is also welded to the flange 27, thereby forming the joint 50b between the arm portion 32 and the carrier portion 20. The reduction of the metallic band portions 36a, 36b on both sides of the protrusion 30 functions as a mechanical lock by crimping or clinching to also secure the arm portion 32 to the flange 27. Although the protrusion 30 is shown as an arcuate surface, being somewhat less than a semicircle in cross-sectional profile, it is to be understood that the protrusion can be configured in numerous other shapes, as long as the protrusion can function as a mechanical lock by crimping or clinching to secure the arm portion 32 to the flange 27. The protrusion 30 should have sufficient height and shape to act as an effective locking device for crimping. Preferably the protrusion 30 has a thickness t within the range of from about 70 percent to about 150 percent of the thickness T of the cross member, although the protrusion can have other heights. It is to be understood that although the joint 50a, 50b is illustrated as being formed in part by mechanical crimping or clinching of the edge portion 36a of the band 36 to the arm portion 32, the bond can be effected or enhanced by the use of adhesive, with or without the use of crimping or clinching.

The foregoing method and process has been shown and described with reference to the carrier portion 20 and the arm portion 32; however, the same principles and process can be applied to both arm portions 32, 32 as well as the joints 52a, 52b between the arm portions and respective wheels spindles 40, 42. Additionally, the process and associated structure related to the pulse weld method described above may be varied and adapted to suit the structure being joined. To that end, applicant hereby incorporates by reference to U.S. Pat. No. 5,966,813.

The principle and mode of operation of this invention have been described in its preferred embodiments. However, it should be noted that this invention may be practiced otherwise than as specifically illustrated and described without departing from its scope.

What is claimed is:

1. A method of joining two vehicle axle housing components made from similar and/or dissimilar materials, the method comprising the steps of:
   a. providing a first axle component housing a first rotatable axle member;
   b. providing a second axle component housing a second rotatable axle member, wherein at least one of the first and second axle components is made from a metallic material;
   c. positioning a portion of the first axle component within a portion of the second axle component in an overlapping manner, thereby forming an overlapping portion;
   d. providing an inductor around the overlapping;
   e. energizing the inductor to generate a magnetic field and to magnetic pulse weld the metallic material, thereby securing the first and second axle components together.

2. The method of claim 1, further comprising the steps of disposing a metallic band around the overlapping portion; providing said inductor around the metallic band; and energizing the inductor to generate a magnetic field for collapsing the metallic band about the overlapping portion and to magnetically pulse weld the metallic band to the overlapping portion, thereby securing the first and second axle components together.

3. The method of claim 1, wherein both the first and second components are dissimilar metallic components.

4. A method of joining two vehicle axle housing components made from similar and/or dissimilar materials, the method comprising the steps of:
   a. providing a first axle housing component;
   b. providing a second axle housing component, wherein at least one of the first and second axle housing components is made from a metallic material;
   c. positioning a portion of the first axle housing component within a portion of the second axle housing component in an overlapping manner, thereby forming an overlapping portion;
   d. providing an inductor around the overlapping;
   e. energizing the inductor to generate a magnetic field and to magnetic pulse weld the metallic material, thereby securing the first and second axle housing components together,
   wherein the first component is a carrier portion for housing a differential assembly and the second component is an arm portion for receiving an axle driven by said differential assembly.

5. The method of claim 4, wherein the carrier portion is made of a metallic material and the arm portion is made of a composite material.

6. The method of claim 5, wherein a section of the carrier portion is positioned within a portion of the arm portion to form the overlapping portion.

7. A method of joining two vehicle axle housing components made from similar and/or dissimilar materials, the method comprising the steps of:
   a. providing a first axle housing component;
   b. providing a second axle housing component, wherein at least one of the first and second axle housing components is made from a metallic material;

c. positioning a portion of the first axle housing component within a portion of the second axle housing component in an overlapping manner, thereby forming an overlapping portion;

d. providing an inductor around the overlapping;

e. energizing the inductor to generate a magnetic field and to magnetic pulse weld the metallic material, thereby securing the first and second axle housing components together, wherein the first component is an arm portion for receiving an axle driven by said differential assembly and said second component is a wheel spindle adapted to rotatably support wheels of the vehicle on the axle housing while allowing the axle to extend therethrough to rotatably drive the wheels.

8. The method of claim 7, wherein the arm portion is made of a metallic material and the wheel spindle is made of a composite material.

9. The method of claim 7, wherein a section of the arm portion is positioned within a section of the wheel spindle to form the overlapping portion.

10. A method of joining two vehicle axle housing components made from similar and/or dissimilar materials, the method comprising the steps of:

a. providing a first axle housing component;

b. providing a second axle housing component, wherein at least one of the first and second axle housing components is made from a metallic material;

c. positioning a portion of the first axle housing component within a portion of the second axle housing component in an overlapping manner, thereby forming an overlapping portion;

d. providing an inductor around the overlapping;

e. energizing the inductor to generate a magnetic field and to magnetic pulse weld the metallic material, thereby securing the first and second axle housing components together, wherein the first component is a carrier portion for housing a differential assembly and the second component is an arm portion for receiving an axle driven by said differential assembly, where a portion of the arm portion is positioned within a portion of the carrier portion to form the overlapping portion.

11. The method of claim 1, wherein an insert is positioned within the metallic component to provide support for the metallic component during the step of welding.

12. A method of joining two vehicle axle housing components made from similar and/or dissimilar materials, the method comprising the steps of:

a. providing a first axle housing component made from a metallic material;

b. providing a second axle housing component made from a composite material, the second axle housing component having a protrusion;

c. positioning a portion of the first axle housing component within a portion of the second axle housing component in an overlapping manner, thereby forming an overlapping portion, wherein the protrusion is within the overlapping portion;

d. disposing a metallic band around the overlapping portion;

e. providing an inductor around the metallic band; and f. energizing the inductor to generate a magnetic field for collapsing the metallic band about the overlapping portion and magnetic pulse welding the metallic band to the metallic component, thereby securing the first and second axle housing components together, wherein the metallic band is crimped over the protrusion.

wherein the first component is a carrier for housing a differential assembly and the second component is an arm portion for receiving an axle driven by said differential assembly.

13. The method of claim 12, wherein the protrusion is a peripheral rim on the second axle housing component.

14. The method of claim 12, wherein the second component has a circular cross-section, and the protrusion is annular.

15. The method of claim 12, wherein the protrusion is integrally molded with the second axle housing component.

* * * * *